(12) United States Patent
Nadata et al.

(10) Patent No.: US 11,167,486 B2
(45) Date of Patent: Nov. 9, 2021

(54) THREE DIMENSIONAL PRINTER SYSTEM (71) Applicant: MAGZERO LLC, Lawrence, NY (US)

(72) Inventors: Michael D. Nadata, Hewlett, NY (US); Fernando A. Peralta, East Elmhurst, NY (US)

(73) Assignee: MAGZERO LLC, Lawrence, NY (US)

( * ) Notice: Subject to any disclaimer, the term of this patent is extended or adjusted under 35 U.S.C. 154(b) by 566 days.

(21) Appl. No.: 15/689,044

(22) Filed: Aug. 29, 2017

(65) Prior Publication Data
US 2019/0061241 A1  Feb. 28, 2019

(51) Int. Cl.
| | |
|---|---|
| *B29C 64/209* | (2017.01) |
| *B33Y 30/00* | (2015.01) |
| *B29C 64/295* | (2017.01) |
| *B33Y 40/00* | (2020.01) |
| *B33Y 50/02* | (2015.01) |
| *B33Y 10/00* | (2015.01) |
| *B29C 64/393* | (2017.01) |
| *B29C 64/386* | (2017.01) |

(52) U.S. Cl.
CPC .......... *B29C 64/209* (2017.08); *B29C 64/295* (2017.08); *B33Y 30/00* (2014.12); *B29C 64/386* (2017.08); *B29C 64/393* (2017.08); *B33Y 10/00* (2014.12); *B33Y 40/00* (2014.12); *B33Y 50/02* (2014.12); *G06T 2219/2021* (2013.01)

(58) Field of Classification Search
CPC ... B29C 64/209; B29C 64/295; B29C 64/393; B29C 64/386; B33Y 10/00; B33Y 30/00; B33Y 40/00; B33Y 40/10; B33Y 40/20
See application file for complete search history.

(56) References Cited

U.S. PATENT DOCUMENTS

| | | |
|---|---|---|
| 6,162,378 A | 12/2000 | Bedal et al. |
| 7,011,783 B2 | 3/2006 | Fong |
| 7,820,088 B2 | 10/2010 | Josephy et al. |
| 8,636,494 B2 | 1/2014 | Gothait et al. |

(Continued)

FOREIGN PATENT DOCUMENTS

| | | |
|---|---|---|
| CN | 104162992 | 11/2014 |
| CN | 204505858 U | 7/2015 |

(Continued)

*Primary Examiner* — Seyed Masoud Malekzadeh (74) *Attorney, Agent, or Firm* — Carter, Deluca & Farrell LLP; George Likourezos (57) ABSTRACT

Technologies are described for printer systems. The systems may comprise a column with a first end in operative relationship with a hopper. The systems may comprise a nozzle at a second end of the column. The nozzle may be configured to deposit melted plastic. The systems may comprise a first heating element. The first heating element may be configured to supply heat sufficient to melt plastic to the column. The systems may comprise an auger within the column. The auger may be configured to transport melted plastic from a first section of the column to the nozzle. The systems may comprise a second heating element. The second heating element may be configured to supply heat to the column to increase a temperature of melted plastic. The systems may comprise a controller. The controller may control a position of the deposited melted plastic relative to a base to form an object.

12 Claims, 6 Drawing Sheets

(56) References Cited

U.S. PATENT DOCUMENTS

| | | | |
|---|---|---|---|
| 9,022,769 B2* | 5/2015 | Swanson | B33Y 10/00 425/375 |
| 9,168,697 B2 | 10/2015 | Crump et al. | |
| 9,527,242 B2 | 12/2016 | Rodgers et al. | |
| 2014/0141168 A1 | 5/2014 | Rodgers | |
| 2015/0028523 A1 | 1/2015 | Jaker et al. | |
| 2015/0077215 A1 | 3/2015 | Ranky et al. | |
| 2015/0130101 A1* | 5/2015 | Fiegener | B33Y 10/00 264/40.4 |
| 2015/0183149 A1* | 7/2015 | Chow | B29C 31/04 425/200 |
| 2015/0183167 A1* | 7/2015 | Molinari | B29C 64/106 425/167 |
| 2015/0321419 A1* | 11/2015 | Linthicum | B33Y 30/00 264/308 |
| 2016/0031159 A1 | 2/2016 | Church et al. | |
| 2016/0038655 A1 | 2/2016 | Weisman et al. | |
| 2016/0096321 A1 | 4/2016 | Fry et al. | |
| 2016/0122541 A1 | 5/2016 | Jaker et al. | |
| 2016/0200024 A1* | 7/2016 | Kim | B29C 48/2522 425/143 |
| 2016/0303802 A1* | 10/2016 | Meshorer | B29C 48/18 |
| 2017/0144369 A1* | 5/2017 | Suvorov | B29C 64/106 |
| 2017/0217088 A1* | 8/2017 | Boyd, IV | B29C 64/209 |
| 2017/0274575 A1* | 9/2017 | Meshorer | B33Y 30/00 |
| 2017/0291364 A1* | 10/2017 | Womer | B29C 48/501 |
| 2017/0312849 A1* | 11/2017 | Yang | B33Y 70/00 |
| 2018/0126636 A1* | 5/2018 | Jang | B29C 48/345 |
| 2019/0047225 A1* | 2/2019 | Luo | B29C 31/044 |
| 2020/0147863 A1* | 5/2020 | Coulter | B29C 64/295 |

FOREIGN PATENT DOCUMENTS

| | | |
|---|---|---|
| CN | 105034393 | 11/2015 |
| CN | 106363904 | 2/2017 |

* cited by examiner

THREE DIMENSIONAL PRINTER SYSTEM

BACKGROUND

A three dimensional printer creates a three dimensional object by an additive manufacturing process in which layers of material are formed successively to create the object. Objects may be of any shape and may be created from a three dimensional model. A three dimensional printer may utilize computer control to form layers and produce the object.

SUMMARY

In some examples printer systems are described. The systems may comprise a hopper. The systems may comprise a column. The column may have a first end and a second end. The first end of the column may be in operative relationship with the hopper. The systems may comprise a nozzle at the second end of the column. The nozzle may be configured to deposit melted plastic. The systems may comprise a first heating element in thermal communication with the column. The first heating element may be configured to supply heat to a first section of the column sufficient to melt plastic within the first section of the column. The systems may comprise an auger within the column. The auger may be configured to rotate within the column to transport melted plastic from the first section of the column to the nozzle at the second end of the column. The systems may comprise a second heating element in thermal communication with the column. The second heating element may be configured to supply heat to a second section of the column to increase a temperature of melted plastic as the auger transports melted plastic to the nozzle. The systems may comprise a controller. The controller may control a position of the deposited melted plastic relative to a base to form an object on the base.

In some examples, methods for three dimensional printing an object are described. The methods may comprise receiving plastic pellets at a hopper. The methods may comprise heating the plastic pellets to produce melted plastic pellets. The methods may comprise transporting the melted plastic pellets along a column to a nozzle. The methods may comprise heating the melted plastic pellets within the column to a temperature setting. The methods may comprise positioning the melted plastic pellets in three dimensions relative to a base. The methods may comprise depositing the melted plastic pellets on the base to print the object.

In some examples, methods for three dimensional printing an orthopedic brace. The methods may comprise scanning a limb. The methods may comprise creating a three dimensional file of the scanned limb. The methods may comprise storing the three dimensional file in a memory. The methods may comprise sending the three dimensional file to a controller. The methods may comprise receiving plastic pellets at a hopper. The methods may comprise heating the plastic pellets to produce melted plastic pellets. The methods may comprise transporting the melted plastic pellets along a column to a nozzle. The methods may comprise heating the melted plastic pellets within the column to a temperature setting. The methods may comprise processing the three dimensional file to position the melted plastic pellets in three dimensions relative to a base. The methods may comprise depositing the melted plastic pellets on the base to print the orthopedic brace.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

Figure 1:
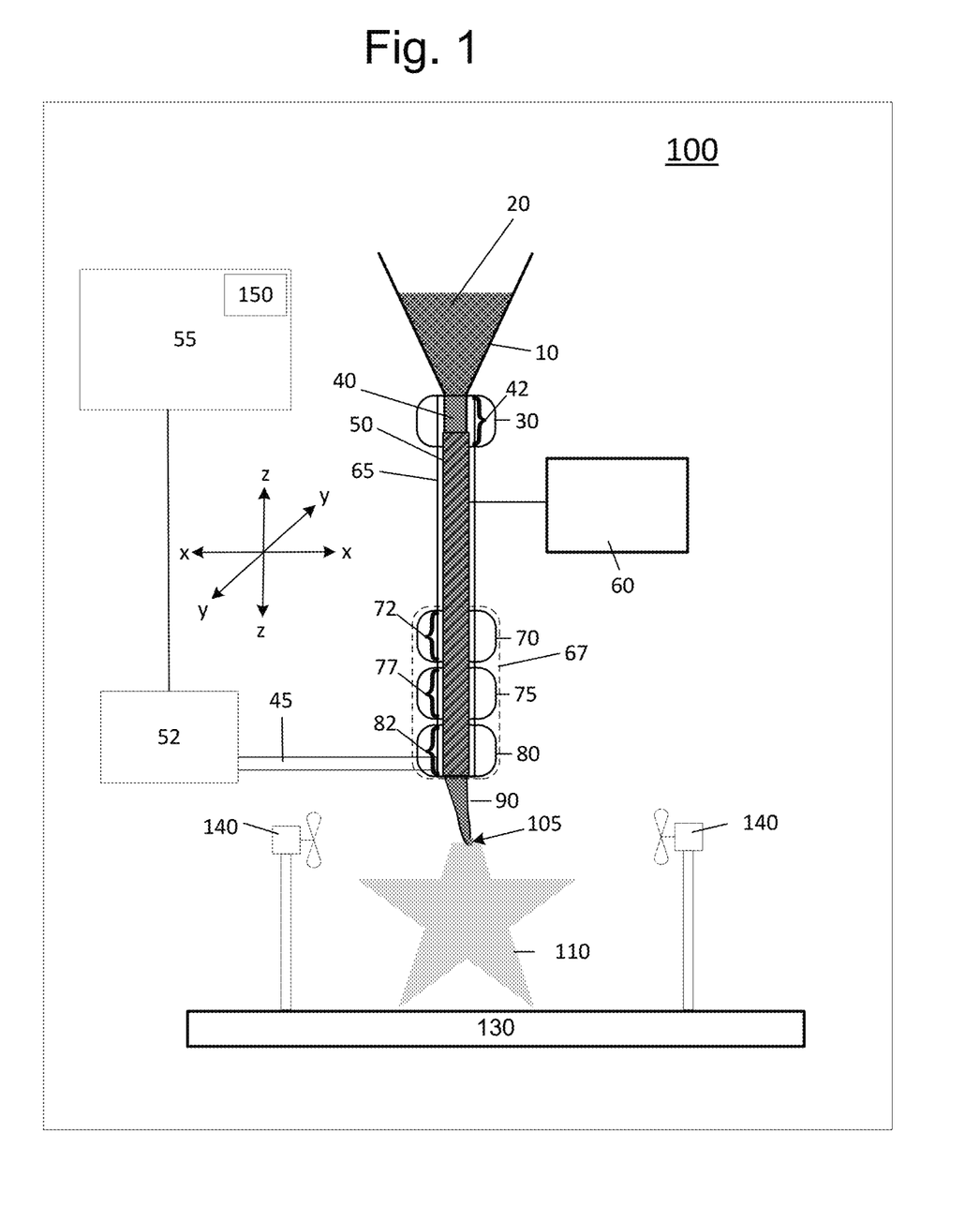
FIG. 1 is a side view illustrating a three dimensional printer system.

FIG. 1 is a side perspective view illustrating a three dimensional printer system, arranged in accordance with at least some embodiments presented herein. As discussed in more detail below, a three dimensional printer system may allow a user to print an object from plastic pellets.

Three dimensional printer system 100 may include a hopper 10, a heater 30, a guide arm 45, an auger 50, a controller 55, a gear box 60, a column 65, a heater 70, a heater 75, a heater 80, a nozzle 90, a base 130, and fans 140. Column 65 may include auger 50 and heaters 30, 70, 75, and 80. Column 65 may be in operative relationship with hopper 10 and nozzle 90. Guide arm 45 may be in operative relationship with column 65.

Hopper 10 may be configured to receive pellets 20. Pellets 20 may include one or more of high density polyethylene (HDPE), low density polyethylene (LDPE), acrylonitrile butadiene styrene (ABS), polycarbonate (PC), polypropylene (PP), polystyrene (PS), acrylic, epoxy, acetal, copolymer, polyethylene terephthalate (PETG), polyactic acid (PLA), nylon, silicon, chocolate, and wax. Pellets 20 may include a master batch including a mixture of more than one pellet material. Pellets 20 may include dye pellets added to a master batch. A base of hopper 10 may be in operative relationship with a first end of a column 65. A second end of column 65 may be in operative relationship with nozzle 90. Heater 30 may be a heating element and may be in thermal communication with column 65 proximate to a base of hopper 10. Heater 30 may supply heat to pellets 20 within column 65 sufficient to melt pellets 20 and produce melted pellets 40. Heater 30 may heat pellets 20 within column 65 to a temperature from 45 degrees Fahrenheit to 450 degrees Fahrenheit. Heater 30 may completely encircle a length of column 65 proximate to base of hopper 10 and may provide even heating throughout a heated section 42 of column 65. Auger 50, located below the heated section 42 of column 65 and the heater 30, may transport melted pellets 40 along column 65 from heated section 42 to nozzle 90.

Auger 50 may be in mechanical communication with gear box 60. Gear box 50 may control a torque (ft·lb) and rotations per minute (RPM) of auger 50. Gear box 60 may control torque and RPM of auger 50 to increase or decrease a flow rate of melted pellets 40 to nozzle 90. Gear box 60 may control torque of auger 50 in a range from 0 ft·lb to 100 ft·lb. Gear box 60 may control RPM of auger 50 in a range from 0 RPM to 100 RPM. Gear box 60 may be easily accessed and calibrated. Auger 50 may rotate within column 65 and transport melted pellets 40 through column 65 from heated section 42 to nozzle 90 at a flow rate controlled by gear box 60.

A heating element 67 may be comprised of heater 70, heater 75, and heater 80 and may be in thermal communication with column 65. Heater 70 may completely encircle a length of column 65 and may provide even heating throughout a heated section 72 of column 65. Heater 75 may completely encircle a length of column 65 and may provide even heating throughout a heated section 77 of column 65. Heater 80 may completely encircle a length of column 65 and may provide even heating throughout a heated section 82 of column 65. Heated section 72, heated section 77, and heated section 82 may be sequentially located along a length of column 65 and heated section 82 may be proximate to nozzle 90. Heater 70, heater 75, and heater 80 may increase a temperature of melted pellets 40 within column 65 as auger 50 transports melted pellets 40 toward nozzle 90. Heater 70 may be set to a first temperature $T_1$, heater 75 may be set to a second temperature $T_2$, and heater 80 may be set to a third temperature $T_3$, such that $T_3 > T_2 > T_1$.

For example, $T_3$ may be 350 degrees Fahrenheit, $T_2$ may be 300 degrees Fahrenheit, and $T_1$ may be 250 degrees Fahrenheit. A temperature of melted pellets 40 may be controlled and gradually increased by heaters 70, 75, and 80 as melted pellets are transported towards nozzle 90 by auger 50. A temperature of melted pellets 40 at nozzle 90 may be adjusted by adjusting $T_1$, $T_2$, and $T_3$ of heaters 70, 75, and 80 respectively so that melted pellets 40 are gradually increased in temperature to $T_3$. $T_3$ may be an optimal temperature for three dimensional printing for melted pellets 40. $T_3$ may be a temperature from 45 degrees Fahrenheit to 450 degrees Fahrenheit.

Controller 55 may include computer guidance control and 55 may include computer number control (CNC) guidance. Controller 55 may execute software, such as executing a file 150 of a three dimensional printable model of an object. File 150 may be created by computer-aided design (CAD), a three dimensional scanner, a digital camera and photogrammetry software, or any other software to create a three dimensional printable model of an object. File 150 may be scanned for errors and repaired prior to execution by controller 55. File 150 may include a numerical control (NC) programming language, such as a G-code file. File 150 may include instructions related to printing of an object 110.

Controller 55 may be in communication with control motor 52. Control motor 52 may be in operative relationship with guide arm 45. Controller 55 may, by controlling control motor 52, control a movement/positioning of guide arm 45 in three dimensions relative to base 103 and thus control a position of column 65 and nozzle 90 relative to base 130. Controller 55 may control motor 52 to position nozzle 90 at a position along an x-axis parallel to base 130 (left to right relative to base 130), a y-axis perpendicular to the x-axis (front to back relative to base 130), and a z-axis (up and down relative to base 130). In another embodiment, nozzle 90 may be in a fixed position, and base 130 may be positioned to an x-axis, y-axis, and z-axis position relative to fixed nozzle 90.

Gear box 60 may control RPM of auger 50, to initiate and control a flow rate of melted pellets 40 to nozzle 90. Melted pellets 40 may flow from nozzle 90 as a tube of melted pellets 105. Tube of melted pellets 105 may be positioned by controller 55. Nozzle 90 may be configured to deposit tube of melted pellets 105 to form object 110 on base 130. Tube of melted pellets 105 may deposit in a layer as tube of melted pellets 105 is positioned by controller 55. As described in more detail below, layers of tubes of melted pellets 105 may be deposited upon previously deposited layers of tubes of melted pellets 105 to form object 110.

Three dimensional printer system 100 may be a closed system. Three dimensional printer system 100 may be maintained at a set temperature and humidity. Fans 140 may provide cooling to deposited layers of tubes of melted pellets 105. Fans 140 may be aimed to direct a flow of air towards object 110 on base 130. Fans 140 may be controlled so as to maintain a set temperature of three dimensional printer system 100.

Figure 2:
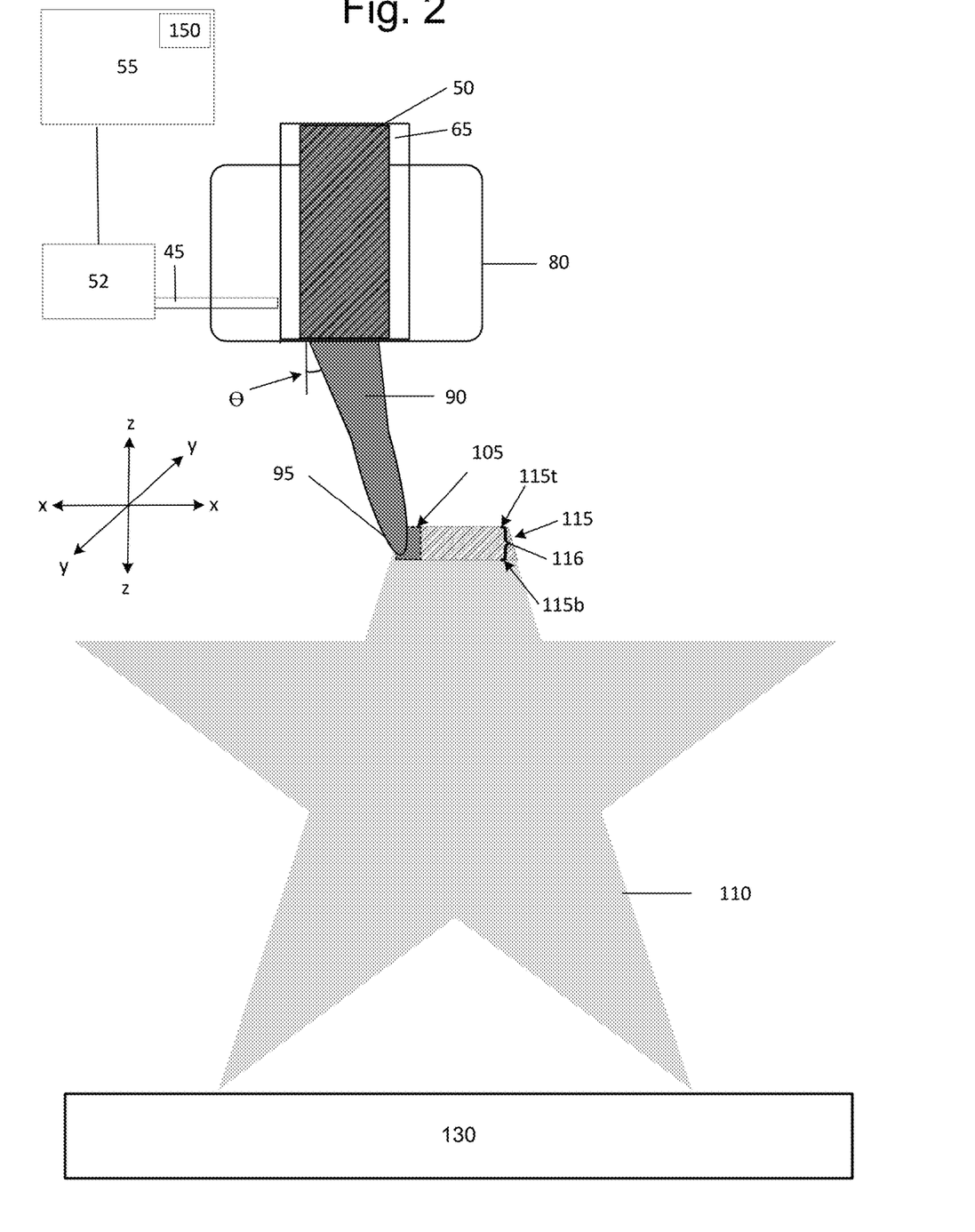
FIG. 2 is a blown up side view illustrating the nozzle of a three dimensional printing system.

FIG. 2 is a blown up side view illustrating the nozzle of a three dimensional printing system, arranged in accordance with at least some embodiments presented herein. Those components in FIG. 2 that are labeled identically to components of FIG. 1 will not be described again for the purposes of clarity.

Nozzle 90 may be shaped so as to direct and deposit a flow of melted pellets 40 from auger 50 at a position designated by controller 55 and deposit a layer of tube of melted pellets 105. Nozzle 90 may be at an angle Θ relative to vertically in line with column 65. Angle Θ may be from 0 to 45 degrees from vertically in line with column 65. Nozzle 90 may include a beveled tip 95. For example, as shown in FIG. 2 controller 55 may position tube of melted pellets 105 to be deposited by nozzle 90 to form layer 115. Layer 115 may have a top 115*t* and a bottom 115*b* which may define a height 116 of layer 115. As discussed in more detail below, controller 55 may subsequently position tube of melted pellets 105 to be deposited by nozzle 90 to form another layer of tube of melted pellets 105.

Figure 3:
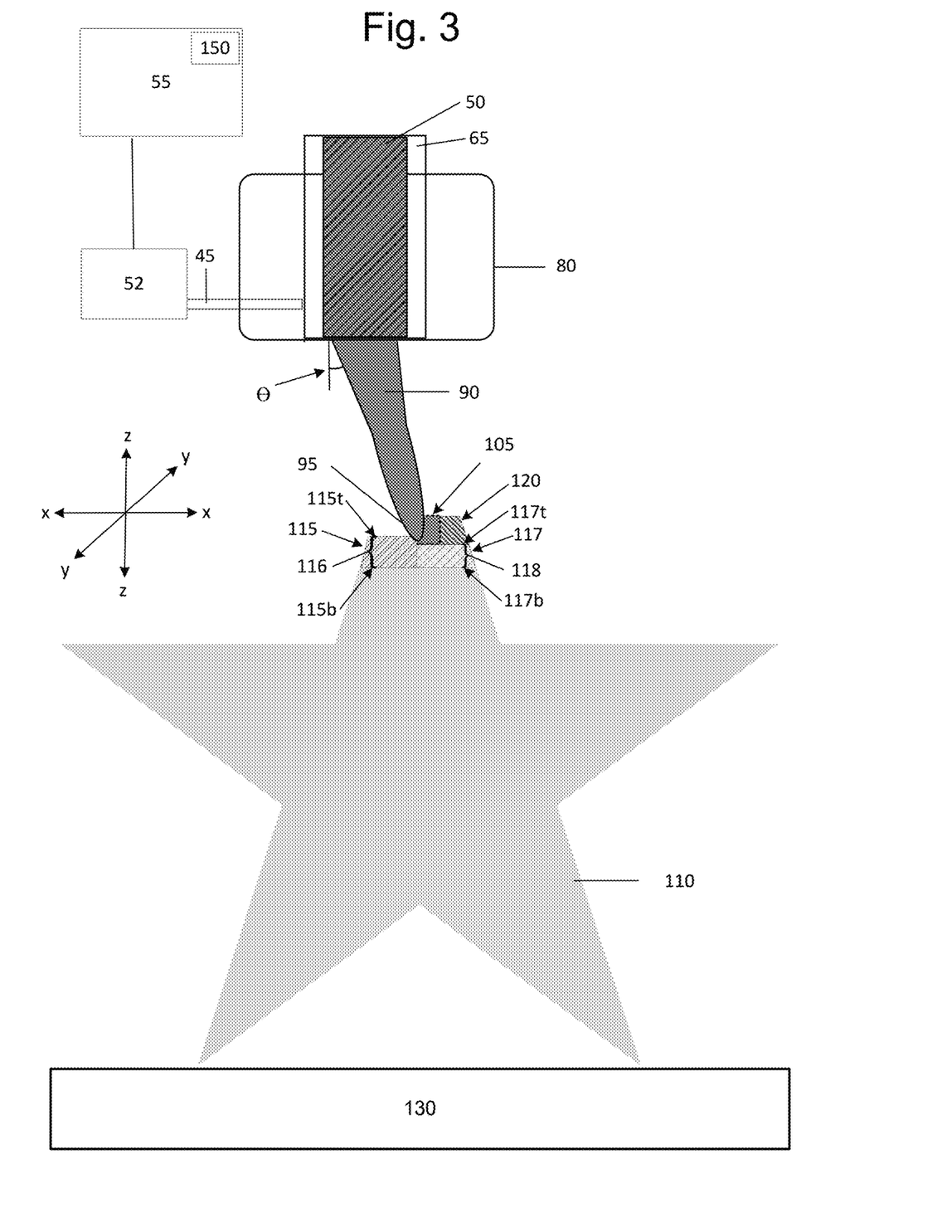
FIG. 3 is a blown up side view illustrating the nozzle of a three dimensional printing system.

FIG. 3 is a blown up side view illustrating the nozzle of a three dimensional printing system, arranged in accordance with at least some embodiments presented herein. Those components in FIG. 3 that are labeled identically to components of FIGS. 1-2 will not be described again for the purposes of clarity. Beveled tip 95 of nozzle 90 may allow nozzle 90 to be positioned at a z-axis position within a previously deposited layer of tube of melted pellets 105.

For example, as shown in FIG. 3 nozzle 90 may be positioned to deposit tube of melted pellets 105 to form layer 120 on top of previously deposited layer 115. Nozzle 90 may be positioned such that beveled end 95 is at a z-axis position between top 115t and bottom 115b of previously deposited layer 115. Nozzle 90 may deposit tube of melted pellets 105 such that tube of melted pellets 105 forming layer 120 compresses previously deposited layer 115 to form compressed layer 117. Compressed layer 117 may have a top 117t and a bottom 117b which may define a height 118 of compressed layer 117. Height 118 may be less than height 116 of previously deposited layer 115. Gear box 60 may control torque and RPM of auger 50, to control a flow rate of tube of melted pellets 105 and control a rate of compression of previously deposited layer 115. Compression of previously deposited layer 115 to compressed layer 117 may result in better adhesion and bonding between compressed layer 117 and layer 120 and may result in a stronger structure of object 110.

Figure 4:
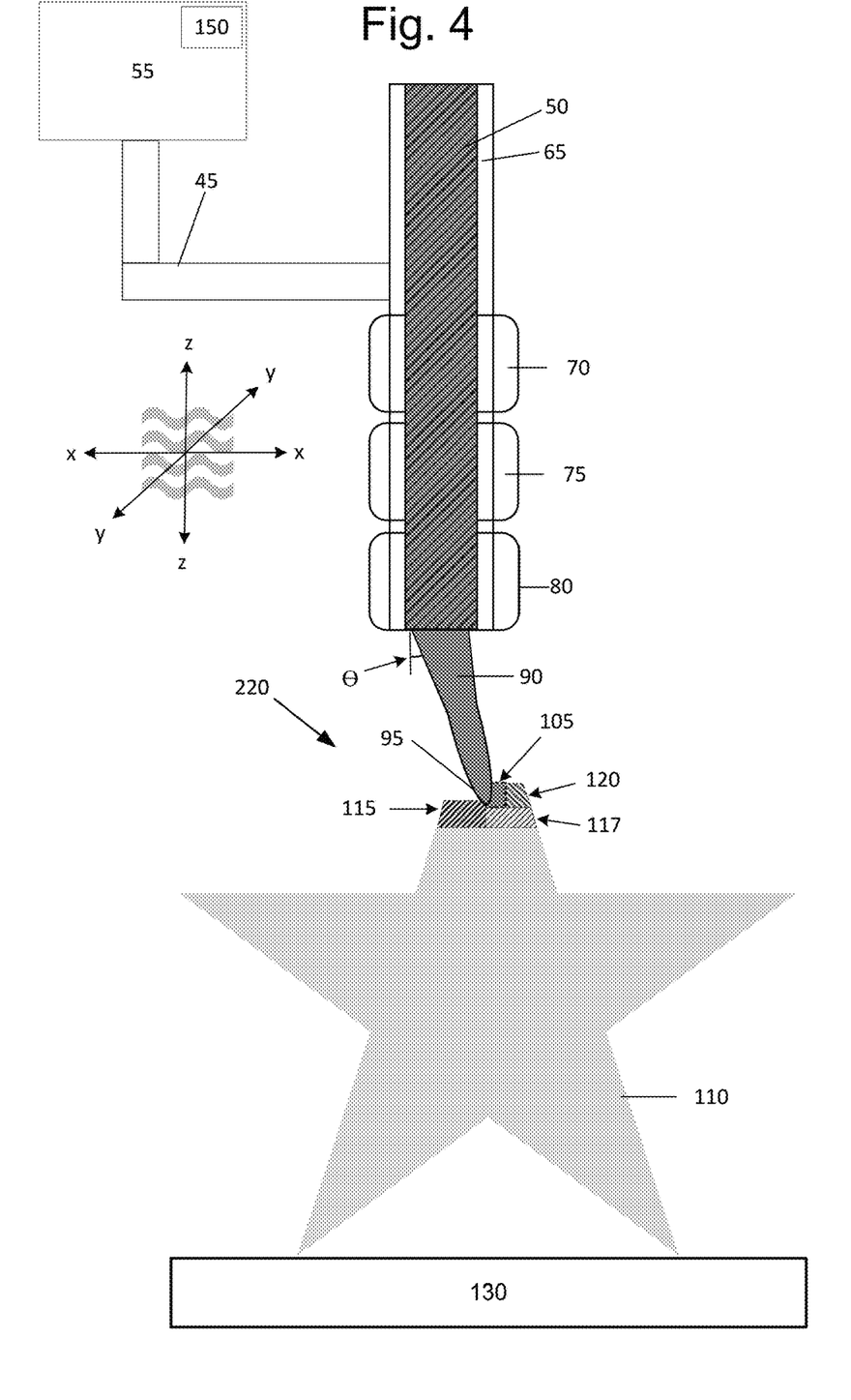
FIG. 4 is a blown up side view illustrating the nozzle of a three dimensional printing system.

FIG. 4 is a blown up side view illustrating the nozzle of a three dimensional printing system, arranged in accordance with at least some embodiments presented herein. Those components in FIG. 4 that are labeled identically to components of FIGS. 1-3 will not be described again for the purposes of clarity.

Controller 55 may control guide arm 45 in three dimensions relative to base 103 and control nozzle 90 in three dimensions relative to base 130. Controller 55 may control guide arm 45 to vibrate nozzle 90 along an x-axis parallel to base 130 (left to right relative to base 130), along a y-axis perpendicular to the x-axis (front to back relative to base 130), and/or along a z-axis (up and down relative to base 130). Controller 55 may vibrate nozzle 90 while nozzle 90 deposits tube of melted pellets 105 to previously deposited layer 115 to form compressed layer 117.

Figure 5:
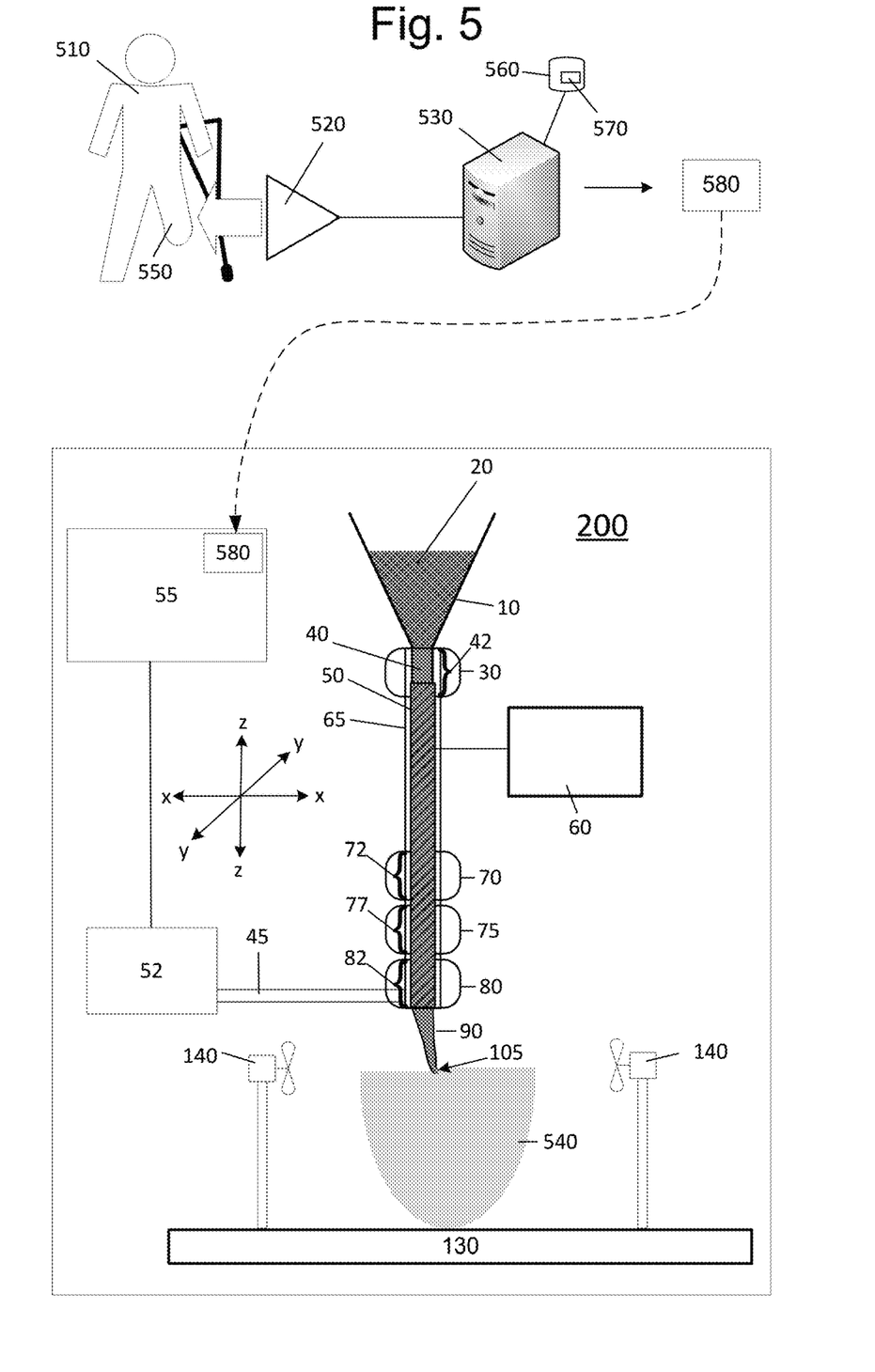
FIG. 5 is a side view illustrating a three dimensional printer system.

FIG. 5 is a blown up side view illustrating a three dimensional printing system, arranged in accordance with at least some embodiments presented herein. Those components in FIG. 5 that are labeled identically to components of FIGS. 1-4 will not be described again for the purposes of clarity.

In an example, three dimensional printing system 200 may print an orthopedic brace 540 for a patient 510. Scanner 520 may scan a limb 550 requiring an orthopedic brace of patient 510. Scanner 520 may utilize three dimensional photogrammetry and may take several images of limb 550. Scanner 520 may include a three dimensional laser scanner, a camera, a tablet device, a cell phone, etc. Scanner 520 may be in communication with a processor 530. Processor 530 may receive images from scanner 520. Processor 530 may execute instructions 570 in a memory 560 to produce file 580. File 580 may be a three dimensional file of scanned limb 550 and may include instructions related to printing of an orthopedic brace 540 based on scanned images of limb 550. File 580 may be stored in memory 560. Processor 530 may be in communication with controller 55. Processor 530 may send file 580 to controller 55. Controller 55 may execute file 580 to position nozzle 90 and deposit layers of tubes of melted pellets 105 to form an orthopedic brace 540.

Figure 6:
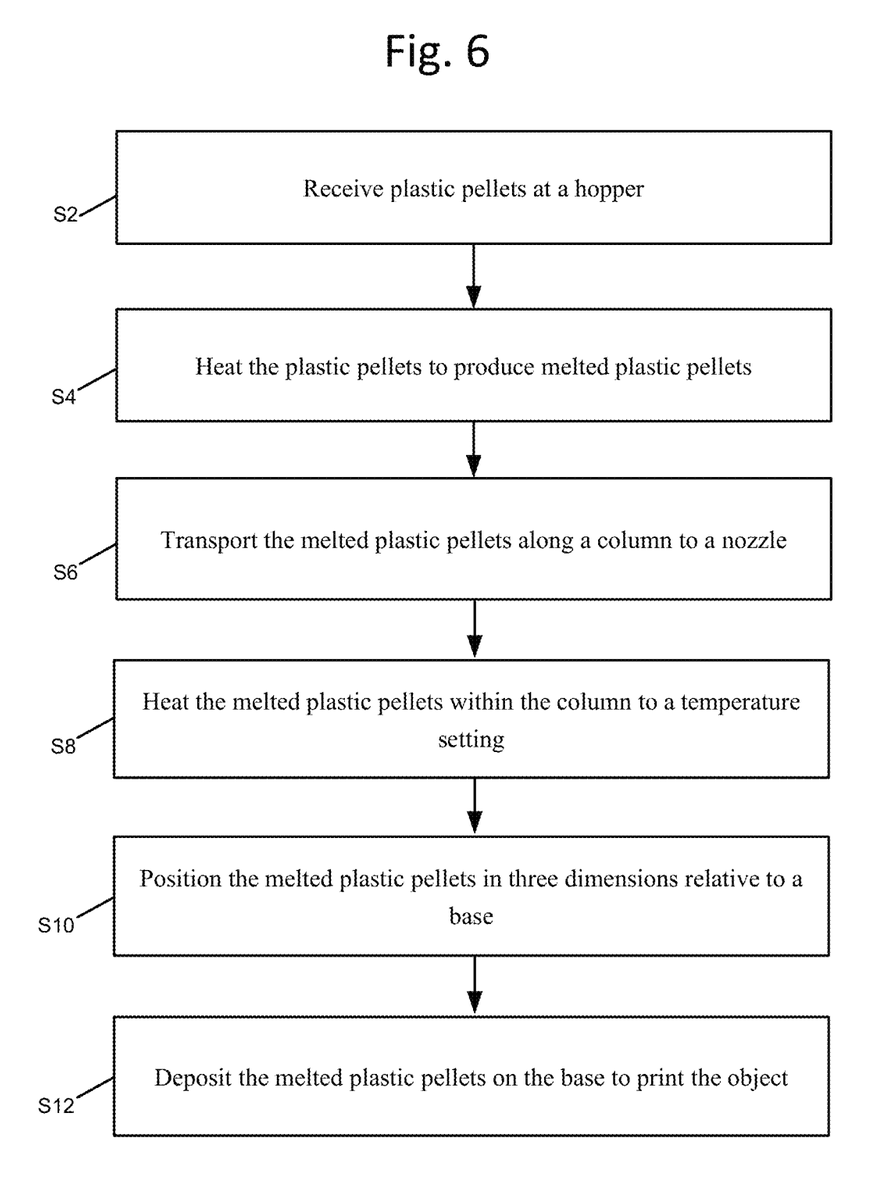
FIG. 6 illustrates a flow diagram of an example process to produce an object utilizing a three dimensional printer system.

FIG. 6 illustrates a flow diagram of an example process to produce an object utilizing a three dimensional printer system. The process in FIG. 6 could be implemented using, for example, systems 100 and 200 discussed above. An example process may include one or more operations, actions, or functions as illustrated by one or more of blocks S2, S4, S6, S8, S10, S12, S14, S16, S18, and/or S20. Although illustrated as discrete blocks, various blocks may be divided into additional blocks, combined into fewer blocks, or eliminated, depending on the desired implementation.

Processing may begin at block S2, "Receive plastic pellets at a hopper." At block S2, plastic pellets may be received at a hopper. The pellets may include one or more of high density polyethylene (HDPE), low density polyethylene (LDPE), acrylonitrile butadiene styrene (ABS), polycarbonate (PC), polypropylene (PP), polystyrene (PS), acrylic, epoxy, acetal, copolymer, polyethylene terephthalate (PETG), polyactic acid (PLA), nylon, and silicon. The pellets may include a master batch including a mixture of more than one pellet material. The pellets may include dye pellets added to a master batch.

Processing may continue from block S2 to block S4, "Heat the plastic pellets to produce melted plastic pellets." At block S4, the plastic pellets may be heated to produce melted plastic pellets. A heater may heat the plastic pellets to a temperature from 45 degrees Fahrenheit to 450 degrees Fahrenheit.

Processing may continue from block S4 to block S6, "Transport the melted plastic pellets along a column to a nozzle." At block S6, The melted plastic pellets may be transported along a column to a nozzle. An auger may transport the melted plastic pellets along the column to the nozzle. The auger may be in mechanical with a gear box. The gear box may control a torque (ft·lb) and rotations per minute (RPM) of the auger. The gear box may control torque and RPM of the auger to increase or decrease a flow rate of the melted pellets to the nozzle. The gear box may control the torque of the auger in a range from 0 ft·lb to 100 ft·lb. The gear box may control the RPM of the auger in a range from 0 RPM to 100 RPM. The gear box may be easily accessed and calibrated. The auger may rotate within the column and transport the melted pellets through the column to the nozzle at a flow rate controlled by the gear box.

Processing may continue from block S6 to block S8, "Heat the melted plastic pellets within the column to a temperature setting." At block S8, the melted plastic pellets within the column may be heated to a temperature setting. A heater may heat the melted plastic pellets to a temperature from 45 degrees Fahrenheit to 450 degrees Fahrenheit.

Processing may continue from block S8 to block S10, "Position the melted plastic pellets in three dimensions relative to a base." At block S10, the melted plastic pellets may be positioned in three dimensions relative to a base. A controller may execute software, such as executing a file of a three dimensional printable model of an object to position the melted plastic pellets. The file may be created by computer-aided design (CAD), a three dimensional scanner, a digital camera and photogrammetry software, or any other software to create a three dimensional printable model of an object. The file may be scanned for errors and repaired prior to execution by the controller. The file may include a numerical control (NC) programming language, such as a G-code file. The file may include instructions related to printing of an object. The controller may be in communication with a control motor. The control motor may be in operative relationship with a guide arm. The guide arm may be in mechanical communication with the column. The controller may, by controlling the control motor, control a movement/positioning of the guide arm in three dimensions relative to the base and thus control a position of the column and the nozzle relative to the base. The controller may control the control motor to position the nozzle at a position along an x-axis parallel to the base (left to right relative to the base), a y-axis perpendicular to the x-axis (front to back relative to the base), and a z-axis (up and down relative to the base). In another embodiment, the nozzle may be in a fixed position, and the base may be positioned to an x-axis, y-axis, and z-axis position relative to the fixed nozzle.

Processing may continue from block S10 to block S12, "Deposit the melted plastic pellets on the base to print the object." At block S12, the melted plastic pellets may be deposited on the base to print the object. The melted pellets may flow from the nozzle as a tube of melted pellets. The tube of melted pellets may be positioned on the base by the controller. The nozzle may be configured to deposit the tube of melted pellets to form the object on the base. The tube of melted pellets may deposit in a layer as the tube of melted pellets is positioned by the controller. Layers of tubes of melted pellets may be deposited upon previously deposited layers of tubes of melted pellets to form the object 110.

A system in accordance with the present disclosure may provide a three dimensional printer with the capabilities to print an object from plastic pellets. A system in accordance with the present disclosure may be more cost effective than other three dimensional printers due to a lower cost of plastic pellets compared to traditional three dimensional printing plastic filament feedstock. A system in accordance with the present disclosure may have the accuracy of a traditional three dimensional printer with the versatility of an extruder. A system in accordance with the present disclosure may print objects with greater strength and in less time than other three dimensional printing systems.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A printer system, the system comprising:
a hopper;
a column with a first end and a second end, wherein the hopper is at the first end of the column;
a nozzle at the second end of the column, wherein the nozzle is configured to deposit melted plastic;
a first heating element in thermal communication with the column, wherein the first heating element is configured to supply heat to a first section of the column, wherein the first section of the column is located at the first of the column adjacent to and in contact with a base of the hopper and the heat supplied by the first heating element is sufficient to melt plastic within the first section of the column;
an auger within the column, wherein the auger is located below the first section of the column and the first heating element and the auger is configured to rotate within the column to transport melted plastic from the first section of the column to the nozzle at the second end of the column;
a second heating element in thermal communication with the column, wherein the second heating element is configured to supply heat to a second section of the column and the heat supplied by the second heating element is sufficient to increase a temperature of melted plastic as the auger transports melted plastic to the nozzle; and
a controller, wherein the controller controls a position of the deposited melted plastic relative to a base of the printer system to form an object on the base of the printer system.

2. The system of claim 1, wherein the hopper includes plastic pellets and the plastic pellets include one or more of high density polyethylene (HDPE), low density polyethylene (LDPE), acrylonitrile butadiene styrene (ABS), polycarbonate (PC), polypropylene (PP), polystyrene (PS), acrylic, epoxy, and acetal.

3. The system of claim 1, wherein the auger is in mechanical communication with a gear box and the gear box controls a torque and rotations per minute (RPM) of the auger.

4. The system of claim 3, wherein the gear box controls the torque of the auger in a range from 0 ft·lb to 100 ft·lb and the gear box controls the rotations per minute (RPM) of the auger in a range from 0 RPM to 100 RPM.

5. The system of claim 3, wherein the gear box controls the RPM of the auger to control a flow rate of melted plastic pellets from the nozzle.

6. The system of claim 1, wherein the first heating element is configured to supply heat to the first section of the column to heat the plastic in the first section of the column to a temperature in a range from 45 degrees Fahrenheit to 450 degrees Fahrenheit.

7. The system of claim 1, wherein the second heating element includes a first heater, a second heater and a third heater wherein:
the first heater is in thermal communication with the column, wherein the first heater is configured to supply heat to a first area of the column within the second section of the column, and the first heater is set to heat plastic in the first area of the column to a first temperature;
the second heater is in thermal communication with the column, wherein the second heater is configured to supply heat to a second area of the column within the second section of the column, and the second heater is set to heat plastic in the second area of the column to a second temperature;
the third heater is in thermal communication with the column wherein the third heater is configured to supply heat to a third area of the column within the second section of the column, and the third heater is set to heat plastic in the third area of the column to a third temperature.

8. The system of claim 7, wherein the third temperature is greater than the second temperature and the second temperature is greater than the first temperature.

9. The system of claim 7, wherein the third temperature is 350 degrees Fahrenheit, the second temperature is 300 degrees Fahrenheit, and the first temperature is 250 degrees Fahrenheit.

10. The system of claim 9, further comprising fans positioned to provide cooling to melted plastic pellets deposited on the base of the printer system.

11. The system of claim 1, wherein the nozzle includes a beveled end, and the nozzle is attached to the second end of the column at an angle from 0 to 45 degrees from vertically in line with the column.

12. The system of claim 11, wherein:
the controller controls a position of the deposited melted plastic in three dimensions relative to the base of the printer system to position melted plastic at a z-axis position within a previously deposited melted plastic layer.

* * * * *